(No Model.)

T. J. POPE.
KNIFE.

No. 300,796. Patented June 24, 1884.

WITNESSES:
H. L. Gates
C. H. Swan

INVENTOR,
Tjerck J. Pope
per E. F. Gennert
his Attorney.

UNITED STATES PATENT OFFICE.

TJERCK J. POPE, OF SAUQUOIT, NEW YORK.

KNIFE.

SPECIFICATION forming part of Letters Patent No. 300,796, dated June 24, 1884.

Application filed August 6, 1883. (No model.)

*To all whom it may concern:*

Be it known that I, TJERCK J. POPE, a citizen of the United States, residing at Sauquoit, in the county of Oneida and State of New York, have invented a new and useful Farrier's or other Form of Knife, of which the following is a specification.

My invention relates to improvements in handles for and shanks of knives, the objects being, first, to produce a cast-metal sectional or separable handle, into which knife-blades may be inserted from time to time, and which handle will outlast many blades; and, second, in the improvement in shanks of knife-blades, wherein the shank is shorter than in the usual mode, making it adaptable to the handle, hereinafter fully described.

Figure 1:
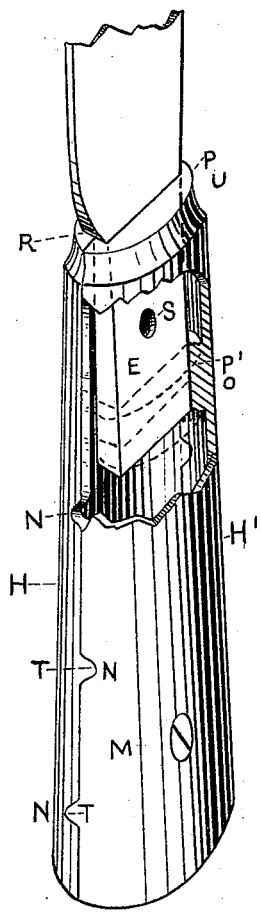
Figure 2:
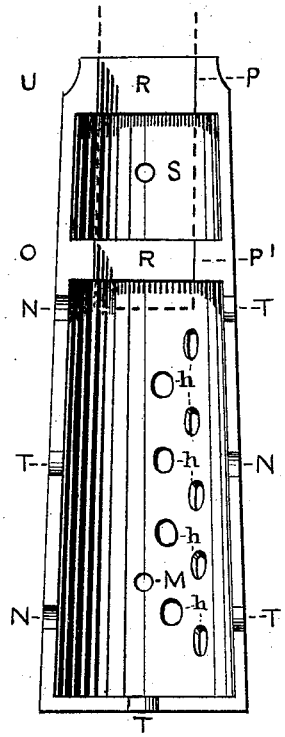

In the drawings making part of this specification, Figure 1 represents my improved handle with the shank of the knife-blade in position; and Fig. 2 shows a section or half of a handle, the shank of the knife-blade being removed, and indicated by dotted lines.

Similar letters refer to similar parts in the two views.

The handle hereinafter described is a sectional one, composed of two parts or sections, which embrace, by means of ribs, the shank of a knife-blade, all being held together by one or more screws. On the inner surface of sections or parts H and H', two sets of ribs, P P', are permitted to remain in casting, having recesses R. When the two parts are put together, these recesses form slots, in which the blade-shank rests. One of these sets of recessed ribs is at the upper end of the handle, as shown at U, and the other set I prefer to place, say, one-third way down, as shown at O. A screw-hole, S, should be left about half-way between these sets of ribs for the passage and retention of a screw.

To keep the sections of the handle in position when placed together, a number of small teats or projections, T, are left on the edge of one part, which fit into notches N in the edge of the opposite section, as shown in Fig. 1.

To lighten the handle it should be hollow, except at both ends and at ribs, and to prevent it from slipping in the hand the outer surface may be roughened or supplied with holes where practicable. A screw, M, should be used to hold the sections of the handle together. It should be placed about one-quarter the distance from the bottom. This is not absolutely necessary, but when employed a firmer hold is had on the shank of the blade, besides being more substantial. The blades of the knives, cutting-edges, shape, &c., may be in any preferred way, the shank E being the essential part, which requires modification to adapt it to my improved handle or a similar one. The shank E, I prefer to forge out flat, somewhat thicker than lower portion of the knife-blade proper, to insure strength. The length of the shank depends on the distance between the recessed ribs P and P', it merely being necessary that the lower end of the shank shall pass into slot at P', which is its lower bearing. A screw-hole corresponding and being in line with hole S of sections of handle should be left in the shank of the blade. Through it the screw passes which connects the two parts of handle together. This prevents the knife-blade from being drawn out of its position in the handle.

Instead of forming the shank full length of the handle, as is done in the ordinary way, I arrange it as above described, thereby saving several inches of material in each knife-shank, which saving, when the best of steel is used, is quite an item in a large quantity of knives.

When a blade is to be inserted in a knife-handle made after my above description, unscrew screw S, and, perhaps giving one or two backward turns to screw M, pass the blade-shank into slots P and P', return screw S into its former place, passing it through the hole in the shank, and tighten up both screws. It is then ready for use, so far as the handle and shank are concerned.

Having now fully described my improvement, what I desire to secure by Letters Patent of the United States, is—

1. In a hollow cast-metal separable or sectional knife-handle, composed of the two parts or sections, H and H', the lower and upper interior ribs, P' and P, having in each an inwardly-facing recess, R, which form slots for embracing or retaining the shank of a knife-blade when the two parts are put together, and, when connected by a screw or screws, forms but one handle, neither part or section being operative without the other, substantially as set forth and described.

2. In a knife-blade, the flat-formed shank E, having a hole centrally located for the passage of a screw, in combination with a hollow metal separable handle composed of two parts or sections, H H', having interior upper and lower ribs, P P', in each of which is formed an inwardly-facing recess, R, which, when sections are put together, form slots for retaining and embracing the shank of the blade, substantially as set forth and described.

TJERCK J. POPE.

Witnesses:
AARON HAMPSON,
SAMUEL ROBBINS.